Aug. 2, 1966     W. J. COSMOS     3,263,517

MOLDED INDUSTRIAL CONTACT WHEEL

Filed June 14, 1965

Inventor
William J. Cosmos

By

Martin Faier
Atty.

United States Patent Office

3,263,517
Patented August 2, 1966

3,263,517
MOLDED INDUSTRIAL CONTACT WHEEL
William J. Cosmos, Mundelein, Ill.
(651 Market St., Waukegan, Ill.)
Filed June 14, 1965, Ser. No. 463,760
9 Claims. (Cl. 74—230.7)

This application is a continuation-in-part of my copending application Serial Number 140,535, filed September 25, 1961, now Patent No. 3,188,775, which is a continuation-in-part of my application Serial Number 698,669, filed November 25, 1957, now Patent No. 3,079,-645, issued March 5, 1963.

The invention relates to improvements in industrial wheel units, and more particularly to high speed contact wheels and expansible sleeve holders for grinding and polishing machines employing revolvable abrasive coated belts or sleeves, and industrial roll sections. An abrasive coated belt or sleeve is trained over the wheel, and the wheel, supporting the belt or sleeve, is rotated at high speed, usually in excess of 1500 r.p.m. These wheels have a resiliently yieldable working periphery, which may be smooth surfaced or treaded, and an inner rigid body area comprising a web portion and a central hub, for mounting the wheel on a revolvable shaft. Prior art wheels were generally constructed by casting from metal or other rigid material the inner rigid body area, and then wrapping the resiliently yieldable rim or working periphery around the peripheral surface of the body area circumference, and thereafter the resiliently yieldable material was bonded and vulcanized to the body portion, and any surface tread milled therein. After such wheels had been so constructed, the same are dressed, balanced at rest, dynamically balanced, and checked for uniformity of diameter.

Such prior art wheels are costly, not only because of the expense of the central casting, but also because of the excessive labor time required to balance the wheel, while at the same time retaining a predetermined diameter. Often, such wheels wobble, because of inaccurate balancing, or because they are mounted on bent or worn shafts, and sometimes the bond between the body area and the resilient rim breaks. The result of such defects can be the generation of excessive noise, excessive or uneven wear on the sleeve, belt, wheel and shaft, lateral shifting of the belt or sleeve, or even explosion of the wheel or breaking the belt, which may result in injury to the machine operator. Where a series of wheels are concentrically mounted side by side on the same arbor there is the added problem of an uneven circumferential surface over the face of the wheels, so that the belt may lose its tracking, and the defects in balance or bond of a single wheel section transmitted to the entire unit.

The object of this invention is to provide an integral one piece contact wheel, particularly suitable for a relatively narrow faced contact wheel or sectionalized industrial roller, which is inexpensive to manufacture, possesses no balancing and bonding problems of the prior art wheels described, the action of which is enhanced by centrifugal forces during rotation. Such a novel wheel generally comprises a layer of resiliently yieldable stress absorbing material arranged between and bonded to a pair on concentric planular rigid discs and a peripheral band of resiliently yieldable material integral with the layer and bonded to the periphery of the discs.

With the foregoing and other objects and advantages in view, the invention consists of certain novel features of construction, illustrated in the accompanying drawings, and pointed out in the appended claims, it being understood that various changes in the form, proportion, size and minor details of structure may be made without departing from the spirit of the invention.

Figure 1:
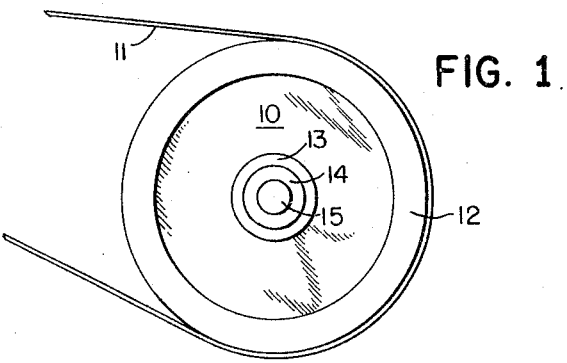
FIGURE 1 is a side elevational view of a wheel or sectionalized industrial roller, with a part of an abrasive belt trained thereover.

The high speed wheel units disclosed herein are made by pressure molding in a heated die assembly. Each unit comprises a pair of rigid discs which are seated in an open die with a mass of unvulcanized rubber, natural or synthetic, of predetermined volume placed therebetween. The dies include rim and hub forming cavities, in which some of the mass of rubber is extruded when the dies close, usually at a pressure of about 2,000 lbs. per square inch. During such extruding, the remaining unvulcanized rubber is distributed evenly between the discs at a thickness determined by the setting of the dies of the mold assembly. Where a tread is desired on the periphery of the wheel, i.e. the circumferential surface, the rim cavity may be surfaced to form the desired configurations. Hubs on the units, if desired, may be formed either by laying unvulcanized rubber "doughnuts" in the cavities, or by aperturing the discs adjacent the hub forming cavities and increasing the unvulcanized rubber mass between the discs, so that when the discs are brought toward one another, the rubber will be pressed through the disc apertures into the hub forming cavities.

The dies are brought toward one another under pressure, and at the same time, while the whole assembly is in the mold, the whole is heated at sufficient temperatures and for a sufficient time to vulcanize the rubber and bond it firmly to the contacted surfaces of the discs. When the wheel unit is removed from the mold, it is mounted on an arbor and rotated at high speeds, and its peripheral work surface is lightly dressed to remove the central circumferential area of the peripheral work surface of the rim, which bulges outwardly slightly at the circumferential center during high speed rotation, due to applied centrifugal forces, so that the dressed wheel, when idle will have a slightly concave surface laterally, which assumes a flat condition on rotation at working speeds.

The industrial roller 10 shown in the drawings has trained thereover an abrasive coated belt 11, and comprises a plurality of individual contact wheel sections 12, mounted in face to face abutment on a shaft 14, having drive connection pins 15. Each wheel section or unit is press-fit over the shaft 14, and held in aligned face to face position with the abutting units and the ends of the assembled sections are held in position by bushings 13.

Each wheel unit comprises a pair of rigid circular plates 17 fabricated by stamping from heavy gauge sheet metal stock. The discs 17 are maintained in spaced relation one to the other by a layer of rubber 18 of predetermined thickness therebetween, and the peripheral margins of the discs may be embedded in a band forming body of rubber 19 that is integral with the layer 18. This web structure, comprised of body 19 and layer 18, will expand outwardly under centrifugal force during high speed rotation of the wheel sufficiently to cause the peripheral rim portion of body 19 to grip an abrasive belt 11 or sleeve trained thereover, and still afford sufficient resiliency to permit the wheel periphery and belt to give under the load of applied work.

Figure 2:
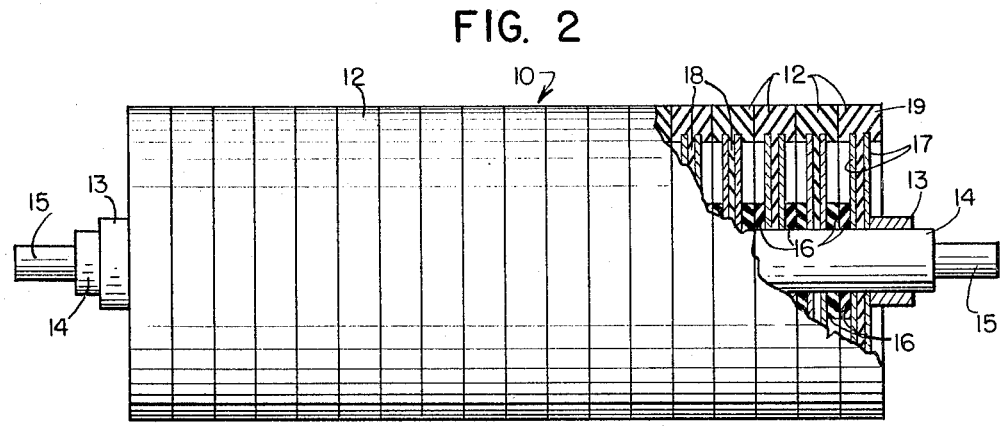
FIGURE 2 is a view of a roller comprised of a number of interchangeable sections, partly in section.
Figure 3:
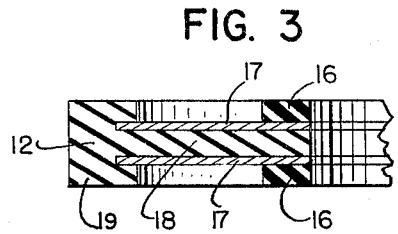
FIGURE 3 is a fragmentary sectional view of one of the wheel sections shown in FIGURE 2.

Hub portions 16, disposed on the outside faces of discs 17, are bonded and vulcanized to the discs during molding, act as spacers between adjacent wheel units, and when a wheel unit is fitted in position on a shaft serve the purpose of frictionally engaging the unit on the shaft. Instead of forming hubs 16 in the mold, as described, the hubs may be eliminated and other means may be used to position the units perpendicular to and frictionally engage the wheels with the shaft; for example, on the right end contact wheel unit shown in FIGURE 2, there is no end hub and bushing 13 is used to position the wheel unit.

Figure 4:
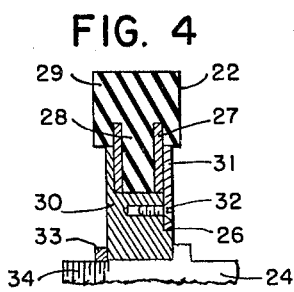
FIGURE 4 is a fragmentary sectional view of another embodiment of the invention, showing a tire type contact wheel section mounted on an arbor shaft.

In FIGURE 4 there is shown a tire type contact wheel unit 22, comprising a pair of rigid circular rings 27, maintained in spaced relation one to the other by a layer of rubber 28 of predetermined thickness therebetween. The peripheral margins of discs or rings 27 are embedded in rim 29, integral with layer 28. Rigid web set 26, comprised of support portion 30 and retaining ring portion 31, which may be secured to the support portion by circumferentially spaced screws 32 threaded therethrough and into the support portion, forms an annular channel to support and position the inner annular leg comprised of the discs 27 and intervening layer 28. The assembled web set and tire type unit may be suitably mounted on and for rotation with shaft 24, as by nut 33 threaded on the end 34 of the shaft. The web set can be used to interchangeably support various tire units, and when rim 29 is worn out, the web set can be used with a new contact wheel tire 22.

Under high speeds, centrifugal forces acting on the rim of the herein disclosed contact wheel units can be controlled, depending upon the density and amount of rubber used, so that radial stress applied to the rim is substantially absorbed by the flexible bonding between the discs or rings. Such forces, as well as work pressure loads also exert a lateral force inwardly on each disc so as to increase the rigidity of the discs and thereby eliminate the tendency of the wheel to wobble. Because of the tendency of the rubber to expand outwardly radially, and the concentration of weight of the wheel at the circumferential portion outermost from the axial center, a wheel embodying the present invention will retain its dynamic balance and will run truer at increasingly higher speeds, irrespective of wear spots and minor bends on the arbor.

These wheel units can be used singly or in groups mounted in face to face abutment on the same shaft, depending upon the shaft length and the width of the abrasive belt or sleeve to be trained thereover. Preferably, where the wheels are used singly and have a relatively wide circumferential surface, the thickness of the discs may be proportionally increased to adequately support the rim and overriding band of abrasive material, particularly under the force of applied work load pressure.

It is believed that the invention, its mode of construction and assembly, and many of its advantages should be readily understood from the foregoing without further description, and while preferred embodiments have been shown and described for illustrative purposes, the structural details are capable of wide variation within the purview of the invention as defined in the appended claims.

Accordingly, I claim the following as my invention:

1. A high speed contact wheel unit for driving an abrasive coated belt comprised of a resiliently yieldable stress absorbing layer of material arranged between and bonded to a pair of concentric planar axially apertured circular rigid elements, and a peripheral band of resiliently yieldable material integral with said layer and bonded to the periphery of said elements.

2. The contact wheel recited in claim 1 wherein said elements are fabricated from thin sheet metal and the layer is substantially thicker than said elements.

3. The contact wheel recited in claim 1 wherein the radial size of said layer corresponds to the radial size of said elements and said layer is bonded to the entire opposed inner faces of said elements to form a unitary assembly.

4. A high speed contact wheel unit for driving an abrasive coated belt comprising a tire substantially as wide as the belt to be driven, said tire including a pair of axially apertured elements fabricated from thin rigid sheet material concentrically arranged and spaced one from the other, a layer of resiliently yieldable material of the same diameter as said pair of elements arranged between and bonded to opposed faces of said pair of elements, and a peripheral rim of resiliently yieldable material integral with said layer and bonded to the peripheral margins of said elements, said elements, layer and rim forming a unitary assembly; and an axially apertured web coaxial with said tire which includes an annular circumferential channel for removably securing said tire.

5. A high speed contact wheel for driving an abrasive coated belt comprising a pair of axially apertured planar discs fabricated from thin rigid sheet material concentrically arranged and spaced one from the other, an axially apertured body of resiliently yieldable material and of the same diameter as said pair of apertured discs arranged between and bonded to opposed faces of said pair of apertured discs to form a unitary assembly, said resiliently yieldable body being thicker than the sheet material discs, and a peripheral rim of resiliently yieldable material as wide as said abrasive coated belt integral with the peripheral edge of said resiliently yieldable body, the margins of said discs being bonded to said peripheral rim.

6. A high speed contact wheel for driving an abrasive coated belt comprising a pair of axially apertured circular elements fabricated from rigid sheet material concentrically arranged and spaced one for the other, an axially apertured circular body of resiliently yieldable material arranged between and bonded to opposed faces of said pair of apertured elements to form a unitary assembly, a peripheral rim of resiliently yieldable material integral with the peripheral edge of said resiliently yieldable body, said apertured elements being bonded to said peripheral rim, and axially apertured hub means secured to said rigid apertured circular elements.

7. A high speed contact wheel for driving an abrasive coated belt adaptable to be mounted on and rotated with a central axial shaft comprising a rim of resiliently yieldable material adapted to expand outwardly radially during high speed rotation, the width of said rim being substantially the same as the width of said belt, an internal flange of resiliently yieldable material integral with said rim and spaced inwardly from each edge, thin metal discs one bonded to each face of said flange and each having a peripheral margin bonded to said rim, said internal flange having a uniform thickness considerably greater than the thickness of said discs and being adapted to expand outwardly radially with the rim when the wheel is rotated at high speed, and hub means secured to said discs for mounting the wheel substantially perpendicular to and for rotation with the shaft.

8. A high speed contact wheel for driving an abrasive coated belt adaptable to be mounted on and rotated with a central axial shaft comprising a rim of resiliently yieldable material adapted to expand outwardly radially during high speed rotation, an internal annular extension of like material integral with said rim, axially apertured metal disc means bonded to said extension and having a peripheral circumferential margins bonded to said rim, said extension having a uniform thickness considerably greater than the thickness of said disc means and being adapted to expand outwardly radially with the rim when the wheel is rotated at high speeds, and hub means secured to said disc means for mounting the wheel substantially perpendicular to and for rotation with the shaft.

9. A high speed contact roll adaptable to be mounted on and rotated with a central axial shaft comprising a plurality of concentric like wheel sections, each section comprising a pair of axially apertured planar rigid discs concentrically arranged and spaced one from the other, an axially apertured circular body of resiliently yieldable material of the same diameter as said pair of discs arranged between and bonded to opposed faces of said discs, and a peripheral rim of resiliently yieldable material integral with the peripheral edge of said resiliently yieldable body, the margins of said discs being bonded to said peripheral rim, the discs, body and rim of each section forming a unitary assembly, resilient axially apertured spacer means secured to each section adaptable to maintain said sections spaced one from the other in substantially perpendicular relation to and frictionally engaged with the shaft, and mounting means for removably securing the sections on and for rotation with the shaft.

References Cited by the Examiner

UNITED STATES PATENTS

| | | | |
|---|---|---|---|
| 2,169,623 | 8/1939 | Weiss et al. | |
| 2,444,088 | 6/1948 | Becker | 74—230.1 X |
| 2,530,960 | 11/1950 | Hall | 74—230.1 X |
| 3,083,584 | 4/1963 | Nanson | 74—230.7 |

DAVID J. WILLIAMOWSKY, *Primary Examiner.*

J. A. WONG, *Assistant Examiner.*